Aug. 24, 1965

J. E. CHAPMAN 3,202,760

INTERCOMMUNICATION SYSTEM

Filed April 16, 1962

INVENTOR.
JOHN EARL CHAPMAN
BY Robert L Kahn
ATTORNEY 3,202,760
INTERCOMMUNICATION SYSTEM John Earl Chapman, St. Charles, Ill., assignor to Dukane Corporation, St. Charles, Ill., a corporation of Delaware
Filed Apr. 16, 1962, Ser. No. 187,816
1 Claim. (Cl. 179—1)

This invention relates to an intercommunication system hereinafter abbreviated to "intercom" system and makes possible an intercom system consisting of all master stations of very compact construction having desirable operating characteristics. As is well known in the intercom art, a master station is a station having a speaker and amplifier together with station selector switches and Talk-Listen switches. An important feature of the present invention relates to the fact that each station is equipped with an individual amplifier which is operated in cascade with an amplifier of similar construction at any one called station. Thus the amplifier at any calling station is relied upon to generate voice currents having a certain predetermined level of energy for transmission to one or more called stations. The voice current at each called station is amplified further by the amplifier at such called station to provide reproduction from a speaker at a satisfactory level. The level of amplification at each calling station is such that the voice currents amplified at such calling station have substantially the same energy level as voice currents at a local subscriber station of a conventional telephone system. Thus an easy interchange and cooperation between any station embodying the present invention and any sub-station of a conventional telephone line may be provided.

A system embodying the present invention is characterized by freedom from cross-talk obtained by the expedient of having the energization of all amplifiers including called and calling stations controlled from the station where talk is originating. Thus for example, as the talk shifts back and forth between two stations, the control of such energization of the amplifiers at both stations shifts back and forth with the talk. Such an operating characteristic is obtained in a simple manner by the use of transistors as amplifying means, by the use of a common power supply for the entire intercom system and the switching arrangement.

By providing each station with a one-stage audio frequency transistor type amplifier, a very compact and simple master station can be provided. Master stations embodying the present invention may be interconnected in the usual fashion by cable, the cable providing for a pair of wires for each station in the entire system plus a common ground plus a common power supply wire. Thus the number of wires connecting each station with the system will be two times the number of stations making up the entire system plus two additional wires, one of which is ground wire.

Another desirable characteristic of the system embodying the present invention resides in the means for indicating whether a called station is talking. A third station can get into the busy line by ignoring the busy signal.

In order that the invention may be understood, reference will now be made to the drawings wherein.

It is understood that all stations are alike and that any desired number can be used.

Figure 1:
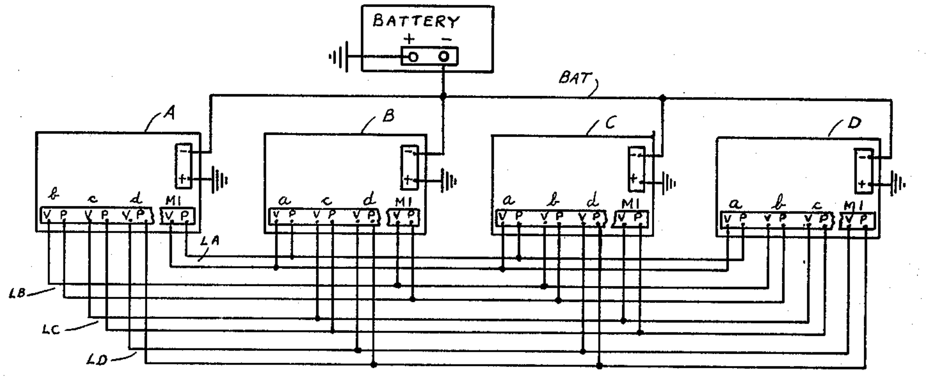
FIGURE 1 is a diagrammatic showing of a four station system with interconnecting wiring.

Referring first to FIGURE 1, four stations A, B, C, and D are illustrated in block form. Since there are four stations to the system in this example, each station will have pairs of terminals provided for connection to three station selector switches, hereinafter described, plus a pair of terminals not so connected. Thus, referring to station A for example, there will be within this station selector switches associated with terminals *b*, *c*, and *d* for selecting stations B, C, and D respectively. Similarly station B will have station selector switches wired to appropriate terminals for establishing connection to stations A, C, and D. If more than the four stations are desired, additional pairs of terminals for interconnection may be provided, it being realized that the power source will be adequate to handle the load and that additional station selector switches are provided.

In the system shown, the pairs of interconnecting lines between stations are indicated by LA, LB, LC and LD. Individual lines interconnecting terminals designated as V carry voice currents; individual lines going between terminals marked P carry the battery power for operating signal lamps and powering amplifiers. In addition, there is a common ground return which carries both voice and power currents. In practice, a solid grounded wire circulates between the stations and the ground side of the power source.

Each station has a pair of terminals, MI, designated as the master input to that station. Thus, station A's master input terminals are connected through lines LA to terminals in stations B, C, and D which are associated with selector switches permitting those stations to communicate with station A when desired.

Likewise station B has its MI terminals connected to lines LB which circulate between the stations A, C, and D. Other stations in the system are similarly interconnected.

In accordance with the present invention, a common battery line, indicated as BAT, connects each of the stations with a battery having its positive terminal grounded and its negative terminal connected to the common battery line. The designation of a negative terminal in the battery as the ungrounded potential is arbitrary and it is understood that the polarity may be reversed depending upon the type of transistors and circuitry selected. Instead of a battery, a conventional power supply energized from a conventional 115 volt, 60 cycle line may be provided. Such power supplies are well known. In view of the small current drawn by a complete system, a simple battery, either a dry cell or a storage battery, may be used. In practice, the voltage required will be relatively low such as, for example, about 9 volts or 12 volts, depending upon the type of transistors used.

Figure 2:
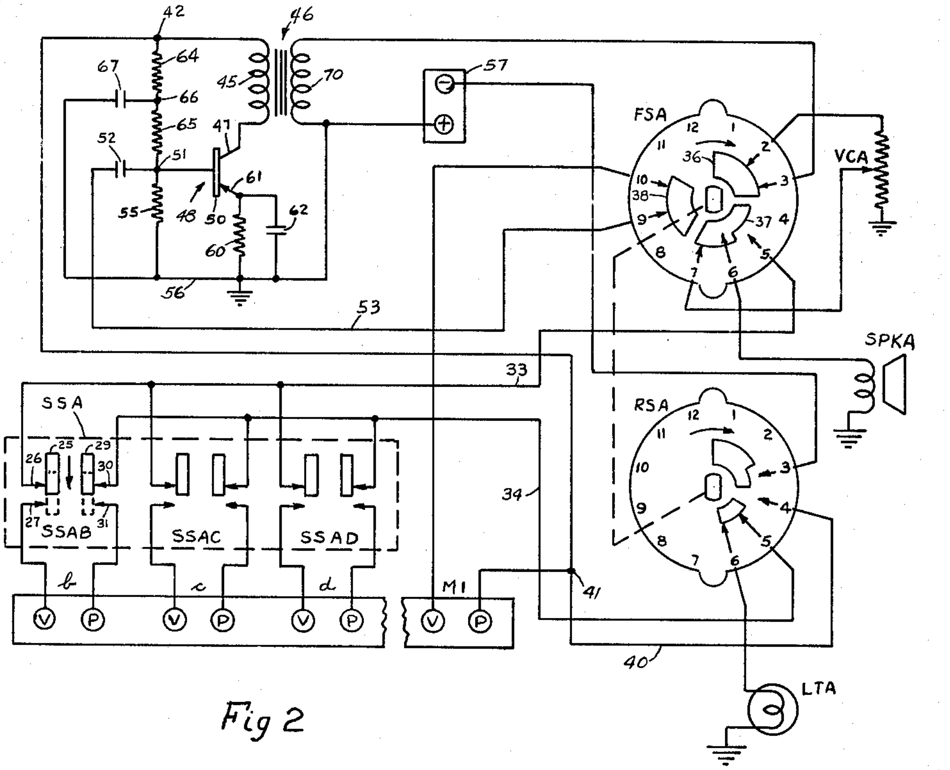
FIGURE 2 is a complete circuit diagram illustrating one of the stations embodying the present invention.

Referring now to FIGURE 2, station A as an example, is shown in detail. Station A has station selector switch SSA having individual switches or switch sections SSAB, SSAC and SSAD. The A part of this designation refers to the station containing the selector switch section, while the last letter, such as B for example, refers to the station to be selected. Each selector switch section consists of two movable contact portions, each of which is adapted to bridge a pair of contacts. Thus as an example, selector switch section SSAB has one moveable contact 25 which when operated to select station B will make contact with fixed contacts 26 and 27. Bottom fixed contact 27 goes to a terminal V which will be connected by one of the line wires of LB. This particular line wire from contact 27 is marked to go to terminal V of station B's master input. Similarly, movable contact 29 which will move with movable contact 25 when station B is selected will close the circuit between fixed contacts 30 and 31. Fixed contact 31 goes down to the right-hand terminal for line LB which is connected to the P terminal of station B's master input.

The top left-hand contact of each of switch sections

SSAB, SSAC and SSAD are all connected to wire 33. The top right-hand contact corresponding to contact 30 for each of the switch sections is connected to wire 34. The bottom contacts corresponding to contacts 27 and 31 for the various switch sections are connected to the terminals as shown going to lines LC and LD. It is understood that the connection of the lines to the various stations are as shown in FIGURE 1.

Referring now to wire 33, this ends up at stationary contact 5 of rotary switch section FSA. Switch section FSA is a conventional rotary switch section having contacts arranged in the pattern indicated with rotary contacts as shown. The numbers for the switch section indicate the switch position as well as the index position. Such a switch is disclosed in United States Patent No. 2,186,949, issued January 16, 1940. This particular switch section illustrated here has a rotor carrying three movable contacts 36, 37 and 38 of the general shape shown to provide for selective switching action. In accordance with convention illustrating this particular type of switch, the arrows extending inwardly indicate stationary contacts and the length of the arrow indicates the contact action with regard to the irregular outer edge of the rotary or movable contacts. As an example, if rotor contact 37 is moved two index positions—this will correspond to an advance of two numbers in the fixed contact array—then the extra long stationary contact 6 on switch section FSA will still make contact with the narnow part of movable contact 37, while stationary contact 7 will lose contact because it is not long enough to reach the narrower portion.

It is understood that this switch section is provided with a suitable operating shaft and knob. For the purposes at hand, this switch section can be biased to the position shown. This position is a Standby position from which the switch may be turned clockwise again for another index position to Talk.

Switch section FSA has a companion switch section RSA. Thus the front and rear portions of a complete switch section may be used in this manner to provide two switch sections, operated from a common shaft. In station B switch sections are correspondingly referred to as FSB and RSB. Corresponding switch designations for stations C and D will be indicated by the last letter in each instance.

Referring now to switch section FSA, stationary contact 6 of this switch section is connected by wire to one terminal of the winding of speaker SPKA. The other terminal of this speaker winding is grounded. It is understood that this speaker is of the type which may be used as a transmitter, this being conventional in the intercom art.

Still referring to switch section FSA, stationary contact 2 is connected to the top terminal of the resistance portion of volume control VCA, the other terminal of which is grounded. The movable wiper of this volume control is connected to stationary contact 7 of switch section FSA. Stationary contact 10 of switch section FSA is connected to terminal V of station A.

Returning to wire 34, this is connected to stationary contact 5 of switch section RSA. Stationary contact 6 of this switch section is connected to one terminal of a busy signal lamp LTA, the other terminal of which is grounded. Stationary contact 4 of switch section RSA is connected by wire 40 to junction points 41 and 42. Junction point 41 is connected by a wire to MI terminal P of the station. Junction point 42 is connected to one terminal of tranformer winding 45 of audio frequency transformer 46. The other terminal of transformer winding 45 is connected to collector electrode 47 of transistor 48. This transistor is here illustrated as being of the PNP type and has base 50 connected to junction point 51. Junction point 51 is connected through capacitor 52 to wire 53 going to stationary contact 9 of switch section FSA. Junction point 51 is also connected through resistor 55 to ground wire 56 going to the positive terminal of battery 57. Ground wire 56 is connected through bias resistor 60 to emitter electrode 61 of the transistor. Resistor 60 is shunted by capacitor 62. Going to junction point 42, two resistors 64 and 65 are connected in series between junction point 42 and junction point 51. Junction point 66 of resistors 64 and 65 is connected to one terminal of bypass capacitor 67, the other terminal of which is grounded.

Going now to transformer 46, this has secondary winding 70 whose top terminal is connected to fixed contact 3 of switch section FSA. The lower terminal of this transformer secondary is grounded.

The operation of the system is as follows.

Assume that station A selects station B and that A's Talk-Listen switch is at Standby. Also assume that station B happens to be talking to station C. Under those conditions, light LTA at station A will go on indicating that station B is in the Talk position. This circuit may be traced as follows: Beginning with station A and starting with ground at the light LTA, a circuit may be traced through the lamp through fixed contacts 6 and 5 of switch section RSA, along wire 34 to fixed contact 30 of station selector switch section SSAB, then fixed contact 31, then along one of the line wires LB, then to terminal P of station B. From terminal P at station B, the circuit continues to junction point 41 to fixed contact 4 of switch section RSB and then to fixed contact 3 of this same switch section. It must be remembered that station B is talking, so that the rotary contact will have been moved clockwise two positions to bridge stationary contacts 3 and 4. The circuit continues at B from fixed contact 3 to the negative terminal of the battery and then through the battery to ground. Thus it will be clear that under those conditions the lamp will be lit at station A.

Now assume that station B is not talking, and for the time being, assume that station A is in Standby condition. When switch section SSAB is moved down, the lamp at station A will not light because switch section RSB at station B will be in the position shown in the diagram for station A, at Standby. However, with lamp at station A not going on, station A will now move his Talk-Listen switch to the Talk position and thus turn both switch sections clockwise from the position shown through two numbers. An energizing circuit for the transistor amplifier in each station will now be completed.

For station A, the energizing circuit will be as follows: from the negative terminal of the battery to fixed contact 3 of switch section RSA to fixed contact 4 of this switch section along wire 40 to transistor amplifier terminal 42 and from there the energization of the amplifier system will be conventional. For station B which has been called, an energizing circuit will be provided as follows: from the negative terminal of the battery along the wire to station A to fixed contact 3 of switch section RSA at station A to fixed contact 5 of this same switch section (the switch section being turned through two index positions will just bridge fixed contacts 3 and 5) along wire 34 to contacts 30 and 31 of switch section SSAB and along one of the line wires LB to MI terminal P of station B. At station B, the circuit continues from MI terminal P to junction 41 of station B up to junction 42 of the amplifier for station B and thus through to ground. It will thus be seen that both amplifiers at stations A and B will be energized.

As far as speaking is concerned, when station A is in Talk position and has selected station B, the following circuits will be established. Beginning at station A, a circuit for voice currents will start from the ground at speaker SPKA and go to stationary contact 6 of switch section FSA. From this contact, the circuit will go on to stationary contact 9 of this same switch section and along wire 53 through condenser 52 to junction point 51. The circuit is completed through bias resistor 55 back to ground. The transistor action is conventional. Amplified currents from the transistor are supplied to primary winding 45 of transformer 46. Transformer 46 has secondary winding 70 whose top terminal goes to fixed contact 3 of switch section FSA. From there, the circuit for amplified currents goes to stationary contact 5 of this same switch section and along wire 33 of station A to contacts 26 and 27 of selector switch section SSAB. From contact 27, the circuit will continue along one of the line wires LB to terminal V of station B. At station B, the circuit will continue from MI terminal V to stationary contact 10 of switch section FSB. The Talk-Listen switch at station B can be either at Standby or Listen and there will be no difference. From stationary contact 10, the circuit will continue to stationary contact 9 of this same B station switch section along wire 53 at station B through condenser 52 to junction 51 of the amplifier at station B. The voice currents will be further amplified and the output will come from transformer winding 70 at station B and will be fed to stationary contact 3 of switch section FSB. From stationary contact 3 of this switch section, the circuit will continue to stationary contact 2 and down through the volume control resistance element VCB (this element in station B corresponds to VCA in station A) to ground. At the same time, the movable wiper on this volume control will feed a desired portion of the voltage to stationary contact 7 of this switch section FSB. From stationary contact 7, the circuit continues to stationary contact 6 and then through speaker SPKB at station B. It will thus be seen that the volume control is effective at the listening or called station.

If B is to talk back to A, it is necessary for B to put down his selector switch section SSBA to select station A for talking. At the same time, the Talk-Listen switch at station B will be put into talking position while the Talk-Listen switch at station A will now be put into listening position. The circuit arrangements will be exactly the same as described.

It is clear that any number of called stations may be connected for conference and the amplifier for each of these called stations will be energized and will operate to provide additional amplification at each called station. Thus there will be no diminution in volume when one station talks to all other stations. If two stations are connected together and the Talk-Listen switch at both stations are in the Talk position, there will be silence, since the amplifier will not be connected. If two stations happen to be connected together and both in Talk position and a third station is connected in Listen position, then the listening station will receive a mixture of the output from both calling stations.

What is claimed is:

In an inter-communication system, a plurality of similarly wired stations, said system having a common power supply for all stations and having wiring inter-connecting all stations, said power supply having a high potential terminal and a ground terminal, each station having: a high potential terminal and a ground terminal, said system wiring including wires connecting all grounds together and wires connecting all high potential terminals together, a transducer, one stage audio frequency transistor amplifier with a signal input and signal output, station selecting switch means and talk-listen switch means, said talk-listen switch means having stand-by, talk and listen positions; circuits including the talk-listen switch means at a calling station when in talking position for completing transistor energizing circuits between the power supply and amplifiers at calling and called stations, a busy signal lamp connected between ground and said talk-listen switch means, said talk-listen switch means providing in the stand-by position only for a connection from the station high potential terminal to one terminal of said lamp, this connection providing for energization of the calling station lamp from the high potential terminal at a called station when the latter is in busy talking condition, and circuits to dispose a calling station amplifier and a called station amplifier in cascade for signals through the calling station talk-listen switch means when in talk position and through the called station talk-listen switch means when in stand-by or listen position, whereby speech input at the calling station transducer will reappear as speech output in the called station transducer for transmission in one direction only.

References Cited by the Examiner

UNITED STATES PATENTS

| | | | |
|---|---|---|---|
| 2,468,911 | 5/49 | Aiken | 179—1 |
| 3,130,272 | 4/64 | Liberman | 179—1 |

ROBERT H. ROSE, *Primary Examiner.*

WILLIAM C. COOPER, *Examiner.*